(12) United States Patent
Cirincione et al.

(10) Patent No.: US 6,652,935 B1
(45) Date of Patent: Nov. 25, 2003

(54) FLINT/AMBER LAMINATED GLASS CONTAINER AND METHOD OF MANUFACTURE

(75) Inventors: Ronald A. Cirincione, Sylvania, OH (US); W. Alan Poolos, Waterville, OH (US); Ronald T. Myers, Whitehouse, OH (US)

(73) Assignee: Owens-Brockway Glass Container Inc., Toledo, OH (US)

( * ) Notice: Subject to any disclaimer, the term of this patent is extended or adjusted under 35 U.S.C. 154(b) by 0 days.

(21) Appl. No.: 09/513,949

(22) Filed: Feb. 28, 2000

(51) Int. Cl.[7] .................... C03B 17/00; A27G 19/22
(52) U.S. Cl. .................... 428/34.6; 65/66; 65/121; 65/126; 65/127; 428/34.4
(58) Field of Search ................. 65/66, 121, 126, 65/127; 428/34.4, 34.6

(56) References Cited

U.S. PATENT DOCUMENTS

| | | | | |
|---|---|---|---|---|
| 1,529,947 A | * | 3/1925 | Freese | 65/121 |
| 3,673,049 A | * | 6/1972 | Giffen et al. | 428/213 |
| 3,849,097 A | * | 11/1974 | Giffen | 65/121 |
| 3,869,270 A | | 3/1975 | Brungs et al. | |
| 3,900,329 A | * | 8/1975 | Grubb et al. | 501/70 |
| 4,214,886 A | * | 7/1980 | Shay | 65/121 |
| 4,381,932 A | * | 5/1983 | Olson et al. | 65/66 |
| 4,457,771 A | | 7/1984 | Ambrogi | |
| 4,740,401 A | | 4/1988 | Barkhau et al. | |
| 5,342,426 A | * | 8/1994 | Dumbaugh | 65/121 |
| 6,176,103 B1 | * | 1/2001 | Scott | 65/121 |

FOREIGN PATENT DOCUMENTS

SU 250394 * 1/1970 ............. 65/121

OTHER PUBLICATIONS

Manning and Diken, "Phenomena Involved in the Melting–Fining of Soda–Lime Glasses," FMC Corporation, 1975.
Simpson and Myers, "The Redox Number Concept and Its Use by the Glass Technologist," *Glass Technology*, vol. 19, No. 4, Aug. 4, 1978, pp. 82–85.

* cited by examiner

Primary Examiner—James Derrington

(57) ABSTRACT

A laminated glass container has an inner layer of amber glass surrounded by an outer layer of flint glass. The container is manufactured by forming a cased glass stream, having an amber glass core and a flint glass casing layer, cutting the stream into individual gobs and molding the gobs into containers, all sufficiently rapidly that the amber glass does not have an opportunity chemically to react with the flint glass.

13 Claims, 1 Drawing Sheet

FLINT/AMBER LAMINATED GLASS CONTAINER AND METHOD OF MANUFACTURE

The present invention is directed to glass containers for food products and the like, and more particularly to a laminated glass container and method of manufacture in which the glass layers are of chemically incompatible composition, such as an oxidized flint glass outer layer over a reduced amber glass inner layer.

BACKGROUND AND OBJECTS OF THE INVENTION

Glass containers are conventionally provided of either clear or colored construction. Clear containers of flint glass composition, for example, are employed for enclosing food products in applications in which it is desirable to be able to view the product through the container wall. On the other hand, amber glass is employed for products such as beer, for example, so that the absorption properties of the glass will decrease transmission of light wavelengths through the container that potentially might degrade the product.

It is also known that flint glass and amber glass are reactive with each other due at least in part to the differing oxidation states of these glasses. One accepted technique for quantifying these differing oxidation states involves use of a so-called "redox number" as described in Simpson and Myers, "The Redox Number Concept and Its Use by the Glass Technologist," *Glass Technology*, Vol. 19, No. 4., Aug. 4, 1978, pages 82–85. Amber glass may be characterized as a reduced glass, having a redox number in the negative range. On the other hand, flint glass may be characterized as an oxidized glass, having a redox number of zero or above. The chemistry for the amber glass coloration is complicated, and is believed to include a complex chromophore of ferric ion and sulfide ions, which is formed in a reducing atmosphere. At forming temperatures at which the glasses are molten, the flint and amber glasses will react with each other forming bubbles or foam in an oxidation/reduction reaction. It is thus necessary when converting a glass container manufacturing line from manufacture of flint glass containers to amber glass containers, for example, fully to remove any residual flint glass in the furnace and forehearth equipment to avoid formation of bubbles in the amber glass containers through redox reactions within the amber glass.

U.S. Pat. No. 4,740,401 discloses an apparatus and method for forming laminated glass containers that comprise an inner core glass surrounded by an outer skin or casing glass. The techniques disclosed in this patent have been employed for manufacture of flint glass containers—i.e., containers having a core layer of flint glass surrounded by a casing layer of flint glass having a lower coefficient of thermal expansion so that, on cooling, the casing layer is placed under compression and provides additional strength to the overall container sidewall. However, problems are to be anticipated when it is considered to employ this technology to form containers having an amber would glass core layer surrounded by an amber glass casing layer. The lower radiation heat transfer characteristics of amber glass make temperature control more difficult for the casing glass because of the relatively low flow rate of the casing glass. Furthermore, any residual flint glass or other contaminants in the casing glass forehearth or other flow equipment could cause production of seeds and blisters through redox reactions for reasons previously indicated. Moreover, the reduced glass composition of the amber glass may cause erosion of precious metal layers of platinum and rhodium in the glass melting system. There would also be substantial expense associated with more frequent replacement of casing glass flow equipment when used with amber glass rather than flint glass. It is therefore a general object of the present invention to provide a method of forming a laminated glass container that addresses one or more of these problems. Another and more specific object of the invention is to provide a method of constructing a laminated amber glass container. A further object of the present invention is to provide a glass container formed by such method.

SUMMARY OF THE INVENTION

Briefly stated, and by way of summary and not limitation, it has been found in accordance with the present invention that laminated glass containers of the character described above can be formed with an inner core layer of amber glass and an outer casing layer of flint glass employing manufacturing equipment and techniques of the type shown in U.S. Pat. No. 4,740,401 without producing blisters or bubbles at the interface between the amber core and flint casing layers. Specifically, it has been found that, employing such equipment and technology, the total time duration during which the flint and amber glasses are together at reactive (molten) temperatures is sufficiently small that the glass containers will be cooled below molten glass temperatures before the redox reactions have an opportunity to occur. Thus, laminated glass containers are provided having an inner core layer of amber glass and an outer casing layer of flint glass without production of the blisters or bubbles at the glass layer interface that would otherwise be expected to occur. Use of flint glass as the casing glass layer overcomes the problems that would otherwise be associated with use of amber casing glass as discussed above—i.e., low radiation heat transfer characteristics, formation of seeds and blisters, and attack on precious metals employed in the glass melting system. The increased optical transmission of the overall container sidewall can be overcome, if needed, by decreasing the optical transmissibility of the amber glass inner layer—i.e., by increasing the intensity of the amber coloration.

There is thus provided in accordance with the present invention a method of forming a glass container that includes the steps of forming a cased glass stream that includes a core glass surrounded by a casing glass, with the core and casing glasses being of chemical compositions that react with each other at molten glass temperatures. Specifically, in the preferred embodiment of the invention, the glass stream includes a reduced core glass, preferably amber glass, and an oxidized casing glass, preferably flint glass. In the preferred implementation of the invention, the cased glass stream is formed into a glass container by cutting a mold charge gob. from the stream and molding the gob into a laminated glass container sufficiently rapidly that the glasses do not have an opportunity to react with each other. When implementing the invention in conjunction with an individual section glassware forming machine, it is preferred to form multiple cased glass streams, multiple gobs and multiple glass containers simultaneously in each section of the machine.

In accordance with another aspect of the present invention, there is provided a laminated glass container that comprises an inner layer of amber glass surrounded by an outer layer of flint glass.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
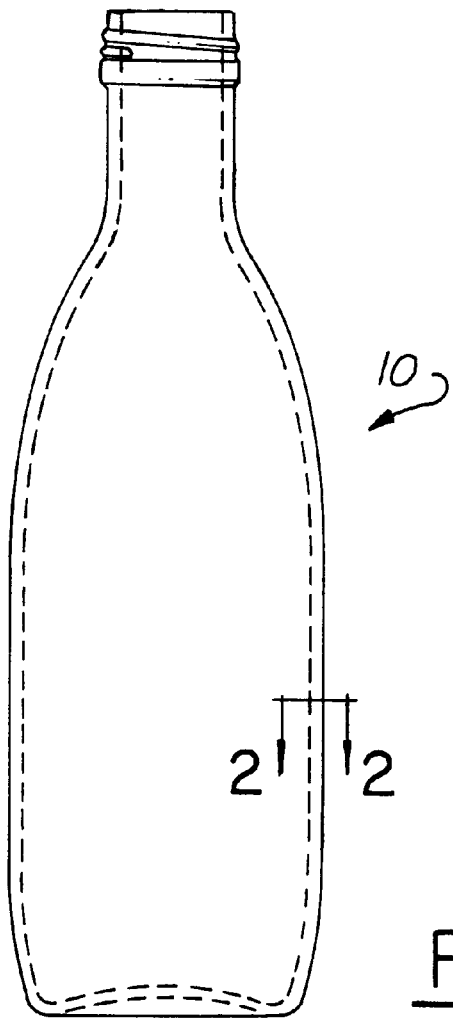
FIG. 1 is an elevational view of a laminated glass container in accordance with one presently preferred embodiment of the invention.
Figure 2:
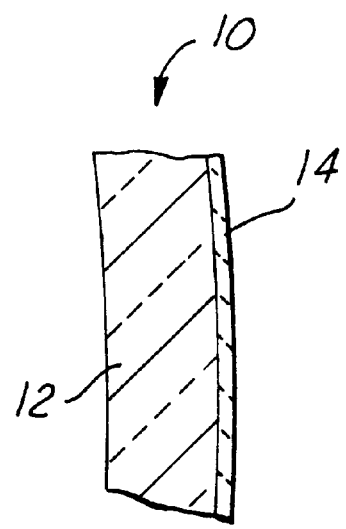
FIG. 2 is a fragmentary sectional view on an enlarged scale taken substantially along the line 2—2 in FIG. 1.

FIGS. 1 and 2 illustrate a laminated glass container 10 in accordance with one presently preferred embodiment of the invention as comprising an inner or core layer 12 of amber glass surrounded by an outer or casing layer 14 of flint glass. The term "amber glass" is employed in its conventional sense in glass technology as referring to a glass having an amber coloration that reduces transmission of light through the glass container, which might degrade the product such as beer within the container. Amber glass is a reduced glass, typically having a redox number on the order of −20 or below. A currently preferred amber glass has the following composition:

TABLE 1

| Analysis (Wt. %) | | Properties | |
|---|---|---|---|
| $SiO_2$ | 72.173 | Redox No. | −27.7 |
| $Al_2O_3$ | 1.711 | Viscosity | |
| $Na_2O$ | 13.840 | Log 2 | 2638.3 |
| $K_2O$ | 0.226 | Log 3 | 2169.5 |
| MgO | 1.090 | Log 7 | 1404.7 |
| CaO | 10.351 | Soft Pt. | 1343.9 |
| $TiO_2$ | 0.065 | Ann. Pt. | 1020.2 |
| SrO | 0.009 | Liquidus | 1867.8 |
| $SO_3$ | 0.161 | Cool Time(s) | 100.0 |
| $Fe_2O_3$ | 0.348 | Ex. (0–300 deg) | 88.3 |
| $Cr_2O_3$ | 0.013 | Dens. (gm/cc) | 2.5036 |
| BaO | 0.011 | USPXXIII | 7.1 |

This is a standard amber glass that has been employed by applicants' assignee for manufacturing amber beer bottles.

The term "flint glass" (sometimes also called "clear glass")is likewise employed in its conventional sense to refer to a glass of essentially clear or transparent construction. Flint glass is an oxidized glass, typically having a redox number of zero or above. A presently preferred flint glass has composition and properties as follows:

TABLE 2

| Analysis (Wt. %) | | Properties | |
|---|---|---|---|
| $SiO_2$ | 71.455 | Redox No. | 1.9 |
| $Al_2O_3$ | 1.117 | Viscosity | |
| $Na_2O$ | 11.274 | Log 2 | 2601.2 |
| $K_2O$ | 0.152 | Log 3 | 2159.4 |
| MgO | 2.911 | Log 7 | 1417.6 |
| CaO | 11.360 | Soft Pt. | 1357.8 |
| $TiO_2$ | 0.033 | Ann. Pt. | 1044.8 |
| $B_2O_3$ | 1.249 | Liquidus | 1972.6 |
| $SO_3$ | 0.166 | Cool Time(s) | 95.6 |
| $Fe_2O_3$ | 0.041 | Ex. (0–300 deg) | 81.6 |
| $Cr_2O_3$ | 0.000 | dens. (gm/cc) | 2.5128 |
| $Li_2O$ | 0.242 | USPXIII | 6.7 |

This is a flint glass composition employed by applicants' assignee, in which the coefficient of thermal expansion has been lowered. The coefficient of thermal expansion for the core glass may be on the order of $88 \times 10^{-7}$ inches/inch/° C., while the coefficient of thermal expansion of the casing glass may be on the order of $82 \times 10^{-7}$ inches/inch/° C. In container 10 of FIGS. 1 and 2, amber core glass layer 12 is on the order of 93 to 95% of the total container weight, and may have a thickness on the order of 0.040 inches. Flint glass casing layer 14 may have a thickness on the order of 0.005 inches. The flint glass and amber glass have essentially the same viscosity characteristics at the molten glass temperature at which the casing glass stream is formed, typically in the range of 2050 to 2200° F.

U.S. Pat. Nos. 4,740,401, 5,855,646 and 5,935,286 are exemplary of methods and equipment that may be employed for forming a cased glass stream in accordance with the present invention. U.S. Pat. No. 5,824,128 is exemplary of equipment for shearing the cased glass stream into individual mold charges or gobs, and U.S. Pat. No. 5,683,485 is exemplary of equipment for distributing the gobs of molten glass to the individual sections of an individual section glassware forming machine. U.S. Pat. No. 4,362,544 is exemplary of an individual section machine in which charges or gobs of molten glass are formed into individual containers employing either a press-and-blow or a blow-and-blow forming operation. The individual machine sections are identical to each other, and are operated out of phase with each other to produce glass containers that are transferred by a conveyor to an annealing lehr. The disclosures of all patents noted in this application are incorporated herein by reference. The disclosure of the above-noted Simpson and Myers publication is also incorporated herein by reference. When employing such equipment, the total time duration between forming the cased glass stream and cooling the formed container below molten glass temperatures is typically not greater than ten seconds. It is believed that the glass could be maintained above molten temperatures for as long as fifty seconds and produce satisfactory containers in accordance with the present invention.

There have thus been provided a laminated glass container and a method of forming the same that fully satisfy all of the objects and aims previously set forth. Several alternatives and modifications have been disclosed. Although the invention has been described in connection with flint glass over amber glass specifically, the principles of the invention are equally applicable to other glass combinations in which the redox numbers differ significantly, such as amber over flint, flint over emerald green (redox number on the order of −5), flint over blue green (redox number on the order of −10), or flint over UVA green (redox number on the order of +20). The invention is most beneficially employed when the redox numbers differ by at least 20. Other alternatives and modifications will readily suggest themselves to persons of ordinary skill in the art. The present invention is intended to embrace all such alternatives and modifications as fall within the spirit and broad scope of the appended claims.

What is claimed is:

1. A method of forming a glass container that comprises the steps of:
    (a) forming a cased glass stream that includes a core of amber glass surrounded by a casing layer of flint glass,
    (b) cutting a mold charge gob from said stream,
    (c) molding said mold charge gob into a laminated glass container having an inner layer of said amber core glass and an outer layer of said flint casing glass, and
    (d) cooling the container below molten glass temperatures.

2. The method set forth in claim 1 wherein said steps (a) to (d) have a total time duration, during which said glass is molten, of not more than fifty seconds.

3. A method of forming a cased glass stream that comprises the steps of:
- (a) providing a stream of reduced core glass, and
- (b) surrounding said stream of reduced core glass with a layer of oxidized casing glass.

4. The method set forth in claim 3 wherein said reduced core glass comprises amber glass and said oxidized casing glass comprises flint glass.

5. The method set forth in claim 3 wherein said reduced core glass has a redox number of −20 or below, and wherein said oxidized casing glass has a redox number of zero or above.

6. The method set forth in claim 5 wherein said reduced core glass is an amber glass having a redox number of about −27, and said oxidized casing glass is a flint glass having a redox number of about +2.

7. A method of forming a glass container that comprises the steps of:
- (a) forming a cased glass stream that includes a molten core glass surrounded by a molten casing glass, with said core and casing glasses being of chemical compositions that react with each other at molten glass temperatures, and
- (b) forming a glass container from said glass stream sufficiently rapidly that said glasses do not have opportunity chemically to react with each other.

8. The method set forth in claim 7 wherein said core glass and said casing glass have redox numbers that differ by at least 20.

9. A glass container formed in accordance with the method set forth in claim 1.

10. A glass container formed in accordance with the method of claim 7.

11. The method set forth in claim 7 wherein said core glass and said casing glass are selected from the group consisting of: (1) amber core glass and flint casing glass, (2) flint core glass and amber casing glass, (3) emerald green core glass and flint casing glass, (4) blue green core glass and flint casing glass, and (5) UVA green core glass and flint casing glass.

12. The method set forth in claim 7 wherein said core glass comprises amber glass and said casing glass comprises flint glass.

13. The method set forth in claim 12 wherein said amber glass a redox number of about −27 and said flint glass has a redox number of about +2.

* * * * *

UNITED STATES PATENT AND TRADEMARK OFFICE
CERTIFICATE OF CORRECTION

PATENT NO. : 6,652,935 B1
DATED : November 25, 2003
INVENTOR(S) : Ronald A. Cirincione, W. Alan Poolos and Ronald T. Myers It is certified that error appears in the above-identified patent and that said Letters Patent is hereby corrected as shown below:

<u>Title page,</u>
Item [73], Assignee, should read -- Owens-Brockway Glass Container Inc. --.

Signed and Sealed this

Eleventh Day of April, 2006

JON W. DUDAS
*Director of the United States Patent and Trademark Office*